United States Patent
Spanos et al.

(10) Patent No.: US 12,340,295 B2
(45) Date of Patent: Jun. 24, 2025

(54) INTELLIGENT IoT DEVICE WITH WIRELESS-ENABLED DEVICE-FREE OCCUPANCY SENSING

(71) Applicant: The Regents of the University of California, Oakland, CA (US)

(72) Inventors: Costas Spanos, Layfayette, CA (US); Han Zou, Berkeley, CA (US); Yuxun Zhou, Chicago, IL (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1023 days.

(21) Appl. No.: 17/282,353

(22) PCT Filed: Aug. 19, 2019

(86) PCT No.: PCT/US2019/047050
§ 371 (c)(1),
(2) Date: Apr. 1, 2021

(87) PCT Pub. No.: WO2020/072137
PCT Pub. Date: Apr. 9, 2020

(65) Prior Publication Data
US 2021/0279549 A1  Sep. 9, 2021

Related U.S. Application Data

(60) Provisional application No. 62/742,111, filed on Oct. 5, 2018.

(51) Int. Cl.
*G06N 3/04* (2023.01)
*G01S 3/08* (2006.01)
(Continued)

(52) U.S. Cl.
CPC ............... *G06N 3/04* (2013.01); *G01S 7/415* (2013.01); *G01S 7/417* (2013.01); *G01S 13/003* (2013.01);
(Continued)

(58) Field of Classification Search
CPC .... Y02B 20/40; H05B 47/115; G05B 19/048; G05B 2219/23153; G06N 3/04;
(Continued)

(56) References Cited

U.S. PATENT DOCUMENTS 9,413,827 B2 * 8/2016 Sharma ................. H04L 67/303
9,986,623 B1 * 5/2018 Miu ..................... H04B 17/318
(Continued)

FOREIGN PATENT DOCUMENTS

WO  WO-2017156492 A1 *  9/2017  ........... A61B 5/0507

OTHER PUBLICATIONS

Wei Wang, Alex X. Liu, Muhammad Shahzad, Kang Ling, and Sanglu Lu. 2015. Understanding and Modeling of WiFi Signal Based Human Activity Recognition. In Proceedings of the 21st Annual International Conference on Mobile Computing and Networking (MobiCom '15). 65.-75. doi.org/10.1145/2789168.2790093 (Year: 2015).*

(Continued)

*Primary Examiner* — Bernarr E Gregory
*Assistant Examiner* — Juliana Cross
(74) *Attorney, Agent, or Firm* — McCoy Russell LLP

(57) ABSTRACT

An Internet of Things (IoT) device can include a switch module configured to control a power supply for at least one powered device, a WiFi module configured to perform wireless communication and occupancy activity sensing, and a processor configured to determine human activity recognition WiFi measurements from the WiFi module based on the occupancy activity sensing and generate cor- (Continued)

responding commands for the switch module based on the determined human activity recognition WiFi measurements.

18 Claims, 3 Drawing Sheets

(51) Int. Cl.
| | | |
|---|---|---|
| *G01S 7/41* | (2006.01) | |
| *G01S 13/00* | (2006.01) | |
| *G01S 13/62* | (2006.01) | |
| *G06N 3/08* | (2023.01) | |
| *G16Y 40/10* | (2020.01) | |
| *G16Y 40/30* | (2020.01) | |
| *H04W 84/12* | (2009.01) | |

(52) U.S. Cl.
CPC .............. *G01S 13/62* (2013.01); *G06N 3/08* (2013.01); *G16Y 40/10* (2020.01); *G16Y 40/30* (2020.01); *H04W 84/12* (2013.01)

(58) Field of Classification Search
CPC .......... G06N 3/08; G01S 7/415; G01S 7/417; G01S 13/003; G01S 13/62; G01S 7/412; G01S 7/006; G16Y 40/10; G16Y 40/30; H04W 84/12; F21V 23/0471
See application file for complete search history.

(56) References Cited

U.S. PATENT DOCUMENTS

| | | | |
|---|---|---|---|
| 2015/0347114 A1* | 12/2015 | Yoon ................... | H04L 12/2832 717/176 |
| 2018/0032844 A1* | 2/2018 | Yao ........................ | G06V 10/20 |
| 2019/0020530 A1* | 1/2019 | Au ........................ | H04W 72/21 |

OTHER PUBLICATIONS

Zou, H. et al., "DeepSense: Device-free Human Activity Recognition via Autoencoder Long-term Recurrent Convolutional Network," Proceedings of the 2018 IEEE International Conference on Communications (ICC), May 20, 2018, Kansas City, Missouri, 6 pages.

ISA United States Patent and Trademark Office, International Search Report Issued in Application No. PCT/US2019/047050, Nov. 12, 2019, WIPO, 2 pages.

International Bureau of WIPO, International Preliminary Report on Patentability Issued in Application No. PCT/US2019/047050, Mar. 23, 2021, 9 pages.

* cited by examiner

INTELLIGENT IoT DEVICE WITH WIRELESS-ENABLED DEVICE-FREE OCCUPANCY SENSING

CROSS-REFERENCE TO RELATED APPLICATIONS

The present application is a U.S. National Phase of International Patent Application No. PCT/US2019/047050, entitled "INTELLIGENT IoT DEVICE WITH WIRELESS-ENABLED DEVICE-FREE OCCUPANCY SENSING," filed on Aug. 19, 2019, which claims priority to U.S. Provisional Patent Application No. 62/742,111, entitled "INTELLIGENT IoT DEVICE WITH WIRELESS-ENABLED DEVICE-FREE OCCUPANCY SENSING," filed on Oct. 5, 2018. The entire contents of each of the above-identified applications are hereby incorporated by reference for all purposes.

BACKGROUND

Occupancy activity sensing is becoming a vital underpinning for security surveillance, energy consumption estimation and reduction, personalized location-based services, and context-aware services in built environments. Consider occupancy-driven lighting controls as an example. In built environments, lighting systems account for a large proportion of energy consumption. Electric lighting consumes 19% of the total worldwide electricity production.

In the U.S. alone, 404 billion kWh of electricity was utilized for artificial lighting in buildings in 2015, which was approximately 10% of the total U.S. electricity consumption. Hence, it is vital to establish novel strategies to reduce the energy demand for lighting while maintaining or even improving the illumination comfort of the occupants.

Most conventional light switches installed in a built environment are manually controlled on/off switches. Thus, a huge amount of energy is wasted when the area is not occupied. Proper occupancy sensing technologies or even human activity recognition technologies are desired to integrate with the light switch to realize occupancy-driven dynamic lighting.

Previous research claimed that these systems can reduce energy usage due to lighting by 24%. Further energy savings can be generated from tuning lamps' brightness levels according to the occupant's personal preference. In addition to energy savings, maintaining good lighting conditions is also an indispensable component of occupant comfort. There is a strong correlation between lighting satisfaction and occupant mood and productivity.

Using cameras to detect the presence of occupants is the most common method for occupancy sensing. However, this requires line-of-sight for monitoring and dedicated infrastructure to be deployed, the image processing algorithms usually introduce high computational overhead, and, more importantly, continuous monitoring with cameras raises severe privacy concerns.

Another widely used occupancy sensor is the passive infrared (PIR) sensor, which infers occupancy status based on variations in temperature patterns within its detection range. Since they are easy to implement and inexpensive, some companies, e.g., Lutron and GE, have integrated PIR motion sensors with their light switches for occupancy-driven lighting control.

PIR sensors also suffer from a number of drawbacks. Their detection accuracy is coarse-grained (e.g., it detects only whether a zone is occupied or unoccupied) and it has a limited detection range. Another critical issue is that it fails to detect a relatively stationary occupant. This false detection leads to false triggers, undesirably resulting in lights being switched off even though the zone is occupied.

Thus, a light switch that has occupancy sensing capability for occupancy-driven lighting control and does not require active user cooperation nor extra infrastructure is urgently desired.

SUMMARY

The disclosed technology generally includes empowering Internet of Things (IoT) devices with wireless-enabled occupancy activity sensing capability for various emerging occupancy-driven applications in smart homes and smart buildings using the existing wireless modules embedded in the IoT devices. Occupancy activity sensing is becoming a vital underpinning for security surveillance, energy consumption estimation and reduction, personalized location-based services and context-aware services in built environments.

Prevailing occupancy sensing methods rely on camera, passive infrared (PIR) motion sensor, or wearable devices, which undesirably introduce severe privacy concerns and require dedicated devices to be installed or carried by the occupants. In recent years, with the booming development of IoT, billions of IoT devices (e.g., sensors, actuators, controllers, thermostats, power plugs, switches, sound bars, smart speakers, refrigerators, and TVs), are en route to being widely deployed in buildings.

A wireless module is an indispensable module for each IoT device to serve a communication-related purpose. Implementations of the disclosed technology are generally to a methodology that realizes wireless-enabled device-free occupancy activity sensing by analyzing the wireless signals obtained from the existing wireless modules on pervasive IoT devices, thus requiring no intrusive cameras or inconvenient wearables.

Specifically, if an IoT device is a light switch and the wireless communication technique adopted is WiFi, a smart light switch with WiFi-enabled occupancy activity sensing capability may be used for occupancy-driven lighting control. Most existing light switches installed in a built environment are manually controlled on/off switches. Thus, a huge amount of energy is wasted when the area is not occupied.

Although some light switches are equipped with PIR motion sensors, the PIR sensors fail to detect stationary occupants and have limited detection coverage that restrains the performance of occupancy adaptive lighting control. Implementations of the disclosed technology may include a smart light switch for pervasive occupancy-driven lighting control by using an existing WiFi module of the light switch for occupancy sensing, for example. It may include a switch module for controlling the power supply for the lamps, a WiFi module for wireless communication and occupancy motion sensing, and a processor to recognize various human activities based on the WiFi measurements from the WiFi module and generate corresponding brightness commands for the switch module.

In addition to sending and receiving commands to support active user remote lighting controls, the WiFi module together with the processor may also perform various occupancy sensing tasks, e.g. occupancy presence detection, and recognize user's daily activities (e.g., sit, stand, lie, walk, and run) to realize device-free, non-intrusive, and privacy-preserving occupancy-driven lighting control.

Since the WiFi-enabled light switch and other WiFi-enabled Internet of Things (IoT) devices construct a pervasive mesh WiFi network, how the movements of human bodies interfere with ubiquitous WiFi signals may be analyzed, and state-of-the-art and dedicated deep learning algorithms may be designed to identify both macro and micro human activities so that the switch can not only turn on/off based the presence of occupant but also adjust the brightness level according to the physical activity performed by the occupant in the area for optimizing the occupant luminance comfort.

DETAILED DESCRIPTION

Figure 1:
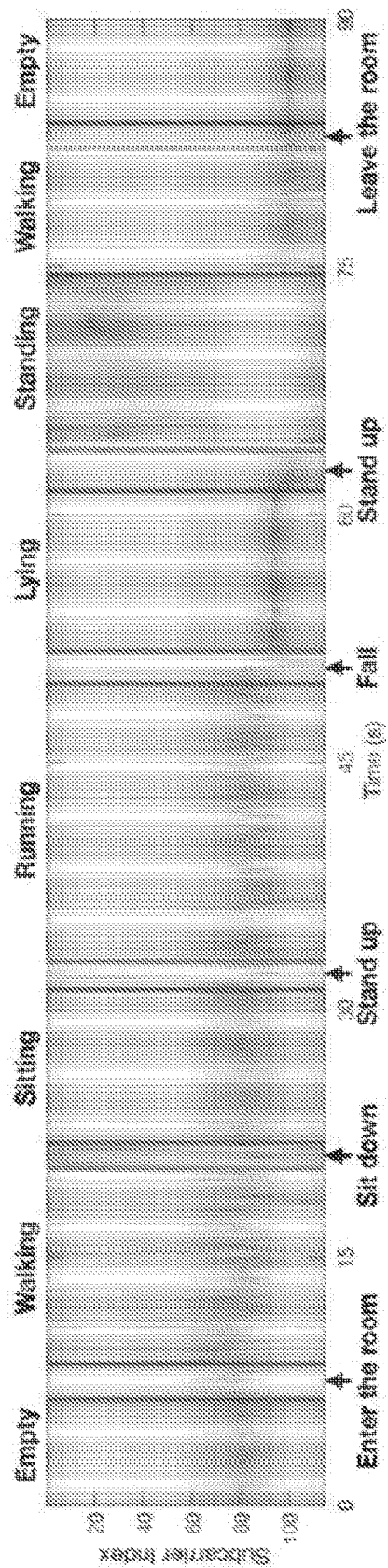
FIG. 1 illustrates an example of CSI amplitude measurements over 114 subcarriers from a TX-RX pair of WiFi-enabled IoT devices for a series of different human activities.

Certain implementations of the disclosed technology are generally directed to a methodology that realizes wireless-enabled device-free occupancy activity sensing by analyzing the wireless signals obtained from existing wireless modules on pervasive Internet of Things (IoT) devices, therefore requiring no intrusive cameras or inconvenient wearables. Specifically, if the IoT device is a light switch and the wireless communication technique adopted is WiFi, a smart light switch with WiFi-enabled occupancy activity sensing capability for occupancy-driven lighting control may be used.

Embodiments may include a controllable power switch for turning the lamps on and off, a WiFi module for wireless communication and occupancy motion sensing, and a processor to recognize various human activities based on the WiFi measurements from the WiFi module and generate corresponding brightness commands for the switch module. In addition to sending and receiving commands wirelessly to support active user remote lighting control, the WiFi module together with the processor may also perform various occupancy sensing tasks, e.g., occupancy presence detection, and recognize a user's daily activities (e.g., sit, stand, lie, walk, and run) to realize device-free, non-intrusive, and privacy-preserving occupancy-driven lighting control.

Since the WiFi-enabled light switch and other WiFi-enabled IoT devices construct a pervasive mesh WiFi network, how the movements of human bodies interfere with ubiquitous WiFi signals may be analyzed, and state-of-the-art and dedicated deep learning algorithms may be determined to identify both macro and micro human activities so that the switch can not only turn on/off based the occupancy detection results but also adjust the brightness level according to the physical activity performed by the occupant in the area for optimizing the occupant luminance comfort.

In the era of IoT, a wireless module has become an indispensable component equipped with IoT devices for communication and data exchange purposes. Among the wireless communication technologies, WiFi has been acknowledged as the primary choice due to the pervasive availability of WiFi infrastructure in the built environment, and most IoT devices are WiFi-enabled.

Although the WiFi signals generated by these devices are mainly designed for communications, they have great potential for occupancy sensing. In recent years, WiFi has been successfully exploited for a myriad of indoor location-based services and context-aware services applications. Various occupancy sensing tasks, e.g., occupancy detection, crowd counting, human activity recognition, and location estimation have been realized by utilizing WiFi signals.

The basic rationale behind such systems is that when people perform different activities, the movement of the human body alters WiFi signal propagation paths between the transmitter (TX) and the receiver (RX). Thus, human motion identification can be inferred by analyzing these changes and variations at the RX without user instrumentation or extra infrastructure.

Furthermore, Channel State Information (CSI), a fine-grained reading in WiFi PHY layer has become accessible recently. The CSI measurements are able to reveal how WiFi signals propagate from TX to RX on multiple paths at each Frequency Division Multiplexing (OFDM) subcarriers, and it has been validated that CSI conveys much richer information and is robust to multipath fading, thus enabling them as an ideal sensing modality for occupancy sensing.

On the other hand, the light switch is an ideal hardware platform for WiFi-enabled device-free occupancy sensing. Firstly, the common installation height of a light switch is typically around 1-1.2 m, which is the same level of people's daily activities, e.g., running, walking, standing, and sitting down. Thus, it has the appropriate height for occupancy sensing compared to other devices (such as plugs installed near the floor, which are too low for occupancy sensing).

Secondly, a light switch is an indispensable device for each room. In a typical room, there is at least one switch installed for lighting control. Thus, the light switch has natural pervasiveness advantages over other IoT devices as the platform for WiFi-enabled occupancy sensing.

Thirdly, there is typically a wired power supply for each light switch so there is no battery issue as with certain other IoT devices. Fourthly, the positions of these light switches are usually fixed after installation. Thus, the human activity classifier constructed based on them is generally more robust and reliable than others (e.g., a smart speaker).

For other IoT devices, the classifier generally needs to be rebuilt when even the locations of the devices are altered. Additionally, light switch manufacturers, e.g., Wemo, Leviton, and TP-Link, have already integrated a WiFi module into their light switches so that the users can control the switches on their mobile devices remotely through WiFi. Thus, the existing WiFi module on the light switch can be upgraded for occupancy sensing.

Certain implementations of the disclosed technology generally include a methodology that realizes wireless-enabled device-free occupancy activity sensing by analyzing the wireless signals obtained from the existing wireless modules on pervasive IoT devices. Specifically, if an IoT device is a light switch and the wireless communication technique adopted is WiFi, a smart light switch with WiFi-enabled occupancy activity sensing may be designed. The WiFi module of the light switch can not only serve as a communication module but also perform human activity sensing in a privacy-preserving and non-intrusive manner so that device-free occupancy-driven lighting control can be realized. Preliminary of CSI WiFi signals propagate through multiple paths from a TX to an RX in indoor environments due to reflection, scattering, and diffraction introduced by walls, doors, and furniture, as well as the movements of occupants. Different from the RSS which only captures the superimposition of multipath signals, CSI reveals fine-grain information about how the signal is propagated and interfered, including different time delays, amplitude attenuation, and phase shift of multiple paths on each subcarrier.

Analyzing these signal propagation variations caused by human motions makes device-free occupancy sensing feasible. In other words, the signal can be modeled as a channel impulse response h (t) and the OFDM receiver is able to provide a sampled version of the signal spectrum of each subcarrier in the frequency domain, which contains both amplitude attenuation and phase shift as complex numbers. These measurements can be summarized as CSI: $H_i = \|H_i\| e^{j \angle H_i}$ where $\|H_i\|$ and $\angle H_i$ denote the amplitude and the phase of the CSI at the $i^{th}$ subcarrier, respectively.

CSI enabled IoT Platform

Existing CSI-based sensing systems generally adopt the Intel 5300 NIC tool to extract the CSI data from laptops with external WiFi NIC cards. Requiring laptops as receivers severely limits them from large-scale implementation. To overcome this bottleneck, a CSI enabled IoT platform may be developed so that the CSI measurements from regular data frames transmitted in the existing traffic can be obtained directly from the WiFi-enabled light switch, as well as other WiFi-enabled IoT devices.

In certain embodiments, OpenWrt may be selected as the OS for the platform since it is a lightweight and widely used Linux OS for embedded devices. The Atheros CSI Tool may be upgraded and a new OpenWrt firmware may be developed for IoT devices for CSI acquisition.

In addition, the platform may report CSI data on all the 114 subcarriers for 40 MHz bandwidth on 5 GHz central frequency, which provides much more information than conventional CSI tools. At each time instance, each TX-RX pair may be able to provide $N_{TX} \times N_{RX} \times 114$ CSI amplitude and phase measurements, where $N_{TX}$ and $N_{RX}$ represent the number of TX and RX antennas, respectively.

CSI Measurements for Human Activities: Intuition

To better understand the influence of different human activities on the CSI measurements, a motivational experiment was conducted using two commercial WiFi modules that commonly integrated with the light switch in order to monitor distinct human activities. In the example, a first module served as a TX and another module acted as an RX and they were placed 3 meters apart and placed on tripods at height of 1.5 meters in a conference room.

In the example, a volunteer performed a series of common human activities, including sitting, standing, walking, lying and running near the TX-RX pair. FIG. 1 illustrates an example of CSI amplitude measurements over 114 subcarriers from the TX-RX pair of WiFi-enabled IoT devices for the series of different human activities. As can be seen in FIG. 1, different human activities create distinct perturbations on the CSI readings.

In general, the CSI measurements under sitting and standing scenarios are relatively smoother than those of walking and running. However, certain subcarriers tend to be sensitive to sitting status while others are more correlated with standing. On the other hand, the CSI amplitudes fluctuated continuously when the occupant was running around the TX-RX pair.

Essentially, as demonstrated in FIG. 1, it appears that the CSI measurement carries unique information about human body movement, hence they are ideal information sources that can be exploited to distinguish human activities under different scenarios. From another perspective, these measurements can be considered as the source of RF 'video monitoring' for human activity recognition. Thus, the CSI time series data may be transformed into CSI frames.

As noted in FIG. 1, the CSI time series data can be divided into small chunks with a window size Δt. The data in each window forms a CSI frame that contains n×m CSI pixels (e.g., where n is the number of consecutive samples and m represents the number of distinct measurements of CSI readings). These CSI frames may serve as an input dataset for a designed human activity classifier.

Figure 2:
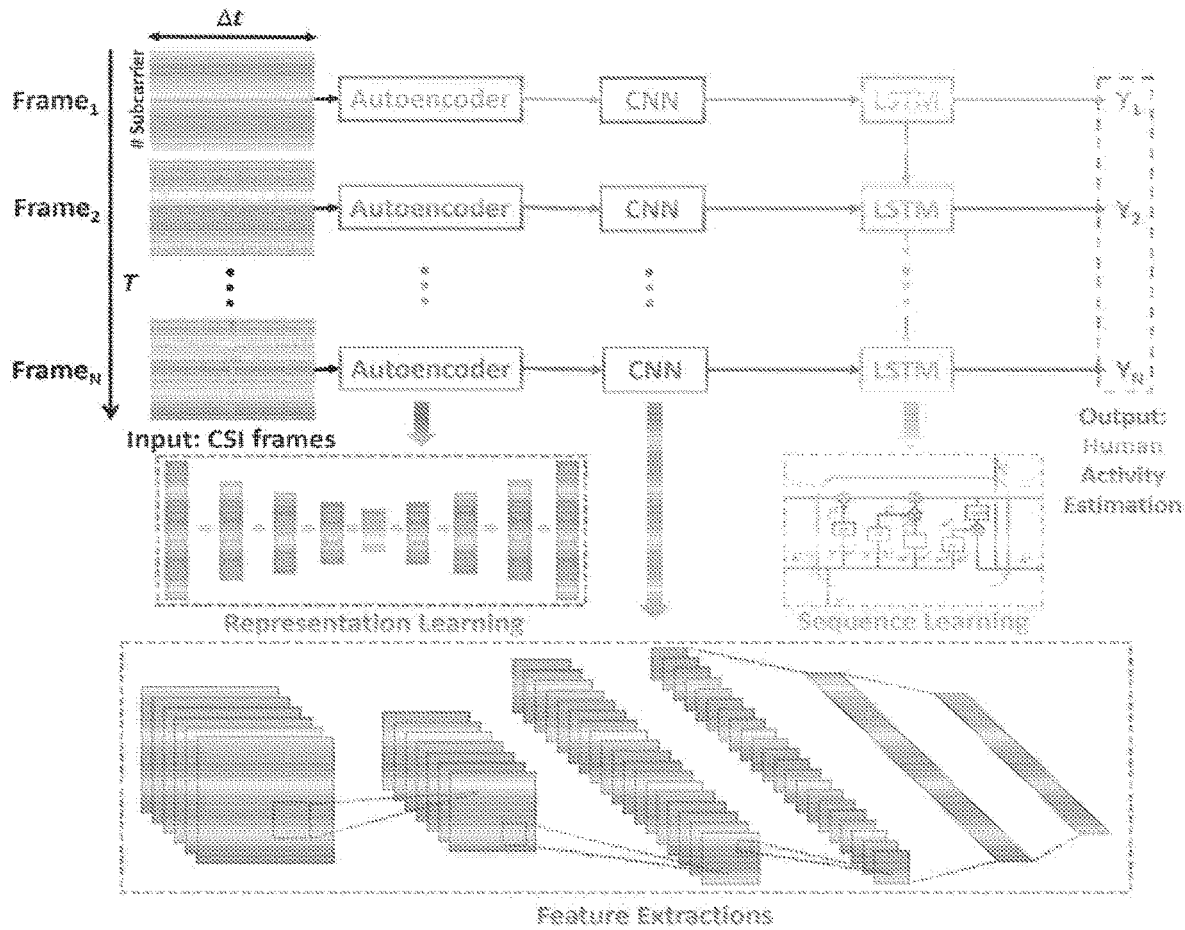
FIG. 2 illustrates an example of a network architecture for an Autoencoder Long-term Recurrent Convolutional Network (AE-LRCN) for device-free WiFi-enabled human activity recognition in accordance with certain implementations of the disclosed technology.

To precisely identify human activities, conventional approaches require tedious feature extraction and training, which involve extensive human intervention and expert knowledge. Moreover, such approaches fail to reveal the temporal dependencies inherent in the data. To address these issues, certain implementations of the disclosed technology include an Autoencoder Long-term Recurrent Convolutional Network (AE-LRCN), a deep learning framework which contains autoencoder (AE), convolutional neural network (CNN) and long short-term memory (LSTM) modules (e.g., as illustrated by FIG. 2) to automatically learn salient features for human activity recognition without the intervention of human processing or domain expert knowledge.

Certain implementations of the disclosed technology may include first sanitizing the inherent noise in each CSI frame and imposing the sparsity of the representation using the AE module, which is followed by the CNN module extracting the most discriminative local features from the learned embedding of AE. Since the CSI measurements are time series data, temporal dependency is a vital property for accurate activity identification.

To that end, the final component of the AE-LRCN in the example consists of an LSTM module, which extracts the temporal dependencies to capture the inherent activity continuation and to realize an accurate and consistent activity recognition. Since all of the parameters in the AE-LRCN are automatically fine-tuned from end to end, it does not require expert knowledge for implementation, which is much more efficient and extendable than existing feature learning methods.

Smart Light Switch with WiFi-Enabled Occupancy Activity Sensing

Figure 3:
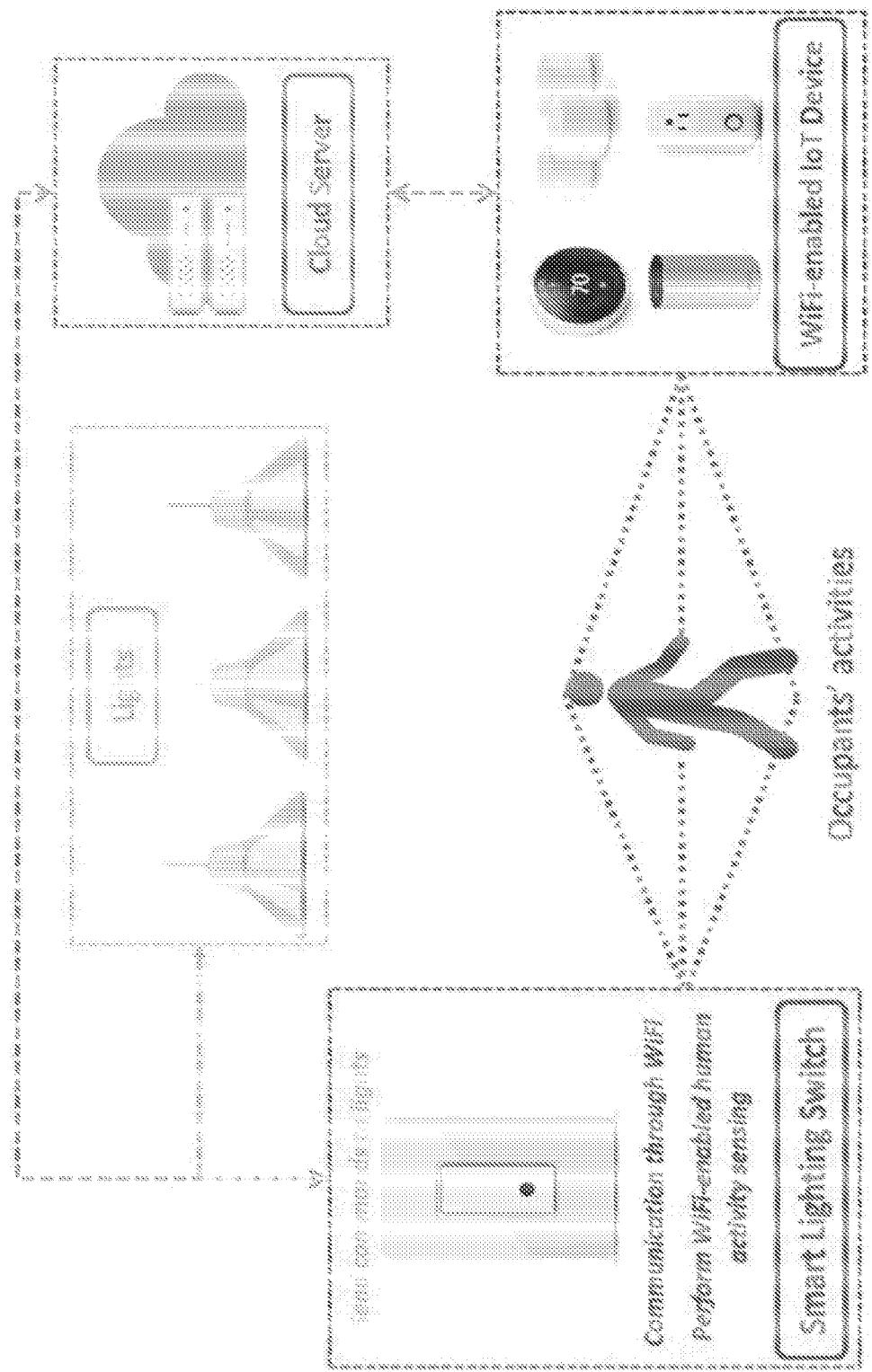
FIG. 3 illustrates an example of a flow chart for a smart light switch with WiFi-enabled occupancy activity sensing in accordance with certain implementations of the disclosed technology.

FIG. 3 illustrates an example of a flow chart demonstrating how the smart light switch may interact with WiFi-enabled IoT devices to achieve device-free occupancy-driven lighting control in an accurate, non-intrusive, and privacy-preserving manner. In the example, the smart light switch consists of three major components: a controllable switch module, a WiFi module for communication and human motion sensing, and a processor to infer the human activities and generate corresponding brightness commands for the switch module.

The WiFi communication and sensing module may be configured perform any or all of the following tasks: receive and send WiFi data packets to communicate with other WiFi-enabled IoT devices so that the user can control the light switch remotely and manually; extract the CSI measurements from the data packets as the raw features for human motion sensing; and forward the CSI time series data to the processor.

The processor is typically responsible for any or all of the following tasks: analyze the CSI time series data and run the human activities classifier for activity recognition; compute the appropriate brightness values of the controlled lamps according to both pre-defined user preference and the inferred activity performed by the user; and send the adjustment command to the controllable switch module.

The WiFi module can serve as an RX or a TX of the CSI-enabled IoT platform and wirelessly interconnect with one or more other WiFi-enabled IoT devices, such as a power plug, thermostat, sound bar, smart speaker, refrigerator, or television, e.g., for occupancy sensing.

If the WiFi module is an RX, it may pull out the CSI data among the data packets and forward them to the processor. The processor may reveal the information that related to human motions and infer the activity type by running a designed classifier that may be empowered with an advanced machine learning engine. Based on the activity performed by the occupant, the corresponding lighting conditions may be estimated. The processor may then send the adjustment commands to the switch so that the desired brightness level can be reflected on the lamps.

When the WiFi module of the smart light switch acts as a TX, it may send data packets to other WiFi-enabled IoT devices. Those IoT devices may serve as RX of the CSI-enabled IoT platform that analyzes the CSI data and infers the human activities using deep learning algorithms on their local processors. If the computational capability of the local processor is limited, these IoT devices may upload the CSI time series data to a cloud server, for example. The cloud server may perform human activity recognition and forward the sensing results and the brightness adjustments to the light switch.

The controllable switch module may change the current or volume supply to the lamps based on the adjustment command sent from the local processor or the cloud server so that the personalized occupancy-driven lighting control can be reflected by the lamps automatically to ensure the lighting comfort for each individual.

Applications

Upgrading the existing WiFi module of the light switch may enable various occupancy sensing tasks in addition to wireless communication. For instance, it may be able to detect the presence of occupants accurately and effectively even when the occupant is stationary (e.g., sitting on a chair or lying on a bed). Conventional PIR motion sensors fail to detect occupants in these scenarios.

In embodiments where the light switch is embedded with a PIR sensor, the sensing results through WiFi can be fused with it to improve the overall accuracy and robustness of the occupancy sensing performance. With this occupancy detection service, the light switch can turn on/off lamps according to the presence of occupant(s) to optimize user convenience and reduce energy consumption. The ambient light sensor can be integrated with the light switch to ensure that the lamp would not turn on where there is sufficient daylight in the room.

In addition to occupancy detection, the disclosed CSI-enabled IoT platform and deep learning algorithms may empower the WiFi module of the light switch to identify more fine-grained human activity recognition and, therefore, realize advanced context-aware dynamic lighting. For instance, when the WiFi module infers that an occupant sits near a table, the light switch may turn on the table lamp automatically and adjust the brightness based on the user's preference. Similarly, when the WiFi module detects that the user is lying on a bed, the ceiling lamps may be dimmed automatically to create the right ambiance so that the user can rest in a more comfortable manner.

In situations where a designed smart light switch is widely deployed in a built environment, a ubiquitous WiFi occupancy sensing network may be constructed by these switches and other WiFi-enabled IoT devices. In this manner, a daily behavior profile for each individual can be built up through the sensing platform, meanwhile allowing occupants to perform their regular in-home activities without the concerns for intrusive cameras or discomforts by wearing devices.

These behavior profiles can facilitate more intelligent and tailored occupancy-driven lighting control. For instance, in a smart home environment, the WiFi module of the light switch may infer that family members usually sit on the sofa in the living room watching TV every Saturday night. According to this observation, the light switch may dim the lights or adjust the color automatically to create the right atmosphere for watching TV at the same time in the following weeks.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. An Internet of Things (IoT) device, comprising:
a switch module configured to control a power supply for at least one powered device;
a wireless communication module configured to perform wireless communication and occupancy activity sensing; and
a processor configured to:
receive Channel State Information (CSI) time series data from the wireless communication module;
transform the CSI time series data into CSI frames, wherein each CSI frame contains multiple CSI pixels representing distinct CSI measurements;
process the CSI frames using an autoencoder to sanitize noise and impose sparsity of representation;
extract discriminative local features using a convolutional neural network from the sanitized CSI measurements;
extract temporal dependencies using a long short-term memory module to capture activity continuation;
determine a stationary occupancy activity based on the processed CSI measurements; and
generate commands for the switch module based on the determined stationary occupancy activity.

2. The IoT device of claim 1, wherein the IoT device is a smart light switch, the at least one powered device is a lamp, the commands are brightness commands, and the wireless communication module is configured to perform the occupancy activity sensing for human activity adaptive lighting control.

3. The IoT device of claim 2, wherein the wireless communication module is further configured to:
receive and send wireless data packets to communicate with other wireless-communication-enabled IoT devices to enable remote and manual control of the smart light switch; and
extract CSI measurements from the wireless data packets for the occupancy activity sensing.

4. The IoT device of claim 3, wherein the processor is further configured to:
store the CSI frames in a local database;
compute appropriate brightness values for the lamp according to pre-defined user preferences and the determined stationary occupancy activity; and
send adjustment commands to the switch module based on the computed brightness values.

5. The IoT device of claim 2, wherein the wireless communication module can serve as a receiver (RX) or a transmitter (TX) of a CSI-enabled IoT platform and wirelessly interconnect with at least one other wireless-communication-enabled IoT device for occupancy sensing.

6. The IoT device of claim 5, wherein the at least one other wireless-communication-enabled IoT device is selected from a group consisting of the following: a power plug, a thermostat, a sound bar, a smart speaker, a router, a refrigerator, and a television.

7. The IoT device of claim 4, wherein the wireless communication module is further configured to serve as an RX and pull out the CSI data among the data packets and forward them to the processor.

8. The IoT device of claim 1, wherein, based on the determined stationary occupancy activity, a corresponding lighting conditions may be estimated.

9. The IoT device of claim 8, wherein the processor is further configured to send adjustment commands to the switch module so that a desired brightness level can be reflected on one or more lamps.

10. The IoT device of claim 5, wherein the wireless communication module is configured to serve as a TX and send data packets to at least one other wireless-communication-enabled IoT device.

11. The IoT device of claim 10, wherein the at least one other wireless-communication-enabled IoT device may be configured to serve as an RX of a CSI-enabled IoT platform configured to analyze the CSI data and infer the human activities using deep learning algorithms on a local processor.

12. The IoT device of claim 11, wherein, if a computational capability of the local processor is limited, the at least one other wireless-communication-enabled IoT device may upload the CSI time series data to a cloud server.

13. The IoT device of claim 12, wherein the cloud server may be configured to perform human activity recognition and forward sensing results and brightness adjustments to the light switch.

14. The IoT device of claim 12, wherein the switch module is configured to change the current or volume supply to the lamp based on the adjustment command sent from the local processor or the cloud server so that the personalized occupancy-driven lighting control can be reflected by the lamp automatically to ensure the lighting comfort for each individual.

15. The IoT device of claim 12, wherein the occupancy sensing output through the wireless communication module fuses with the occupancy estimation by PIR motion sensor if it is also embedded in the smart light switch for more reliable and robust occupancy-driven lighting control.

16. The IoT device of claim 12, wherein, if an ambient light sensor is equipped with the switch, its brightness measurements ensure that the lamp would not turn on where there is sufficient daylight in the room.

17. The IoT device of claim 12, wherein, if there is a camera installed in the same environment, its occupancy sensing results may serve as ground truth for the training process of the human activity classifier construction in the processor of the light switch.

18. The IoT device of claim 1, wherein the stationary occupancy activity includes one or more of a sitting activity and a lying activity.

* * * * *